United States Patent [19]

Chaum

[11] Patent Number: 4,759,063
[45] Date of Patent: Jul. 19, 1988

[54] BLIND SIGNATURE SYSTEMS

[76] Inventor: David L. Chaum, 14652 Sutton St., Sherman Oaks, Calif. 91306

[21] Appl. No.: 524,896

[22] Filed: Aug. 22, 1983

[51] Int. Cl.$^4$ .............................................. H04L 9/00
[52] U.S. Cl. ....................................... 380/30; 380/44; 380/28; 380/9
[58] Field of Search ............... 178/22.11, 22.08, 22.09, 178/22.14; 380/28, 30, 6, 9, 44

[56] References Cited

U.S. PATENT DOCUMENTS

| | | | |
|---|---|---|---|
| 4,086,634 | 4/1978 | Cook | 360/60 |
| 4,200,770 | 4/1980 | Hellman et al. | 178/22.11 |
| 4,218,582 | 8/1980 | Hellman et al. | 178/22.11 |
| 4,308,536 | 12/1981 | Sims, Jr. et al. | 342/71 |
| 4,351,982 | 9/1982 | Miller et al. | 178/22.11 |
| 4,405,829 | 9/1983 | Rivest et al. | 178/22.11 |
| 4,424,414 | 1/1984 | Hellman et al. | 178/22.11 |
| 4,458,109 | 7/1984 | Mueller-Schloer | 178/22.16 |

OTHER PUBLICATIONS

"A Method for Obtaining Digital Signatures and Public-Key Cryptosystems" by Rivest et al., Communications of the ACM, Feb. 1978, vol. 21 #2.
"Multiuser Cryptographic Techniques" by Diffie nd Hellman, AFIPS-Conference Proceedings, vol. 45, 6/8/76, p. 109-112.
"Chosen Signature Cryptanalysis of the RSA (MIT) Public Key Cryptosystem", by George I. Davida, Oct. 1982.
"Advances in Cryptology Proceedings of Crypto 82", by David Chaum, Ronald L. Rivest and Alan T. Sherman, pp. 199-203, Plenum Press.
"Signature Protocols for RSA and Other Public-Key Cryptosystems", by Dorothy E. Denning, Nov. 1982, Computer Sciences Dept., Purdue University, W. Lafayette, Ind.
"Chosen Signature Cryptanalysis of Public Key Cryptosystems", by Richard A. DeMillo & Michael J. Merritt, Oct. 25, 1982. Georgia Institute of Technology, School of Information & Computer Science.
"Proceedings of the 1983 Symposium on Security and Privacy", Technical Committee of Security and Privacy, IEEE Computer Society, Apr. 1983, Oakland, Calif.

Primary Examiner—Salvatore Cangialosi
Assistant Examiner—Aaron J. Lewis
Attorney, Agent, or Firm—Larry S. Nixon; Aldo J. Test

[57] ABSTRACT

A cryptographic system allows, in one exemplary use, a supplier to cryptographically transform a plurality of messages responsive to secret keys; the transformed messages to be digitally signed by a signer; and the signed transformed messages returned to the supplier to be transformed by the supplier, responsive to the same secret keys, in such a way that a digital signature related to each original message is developed by the supplier. One important property of these systems is that the signer cannot determine which transformed message received for signing corresponds with which digital signature—even though the signer knows that such a correspondence must exist.

41 Claims, 3 Drawing Sheets

BLIND SIGNATURE SYSTEMS

BACKGROUND OF THE INVENTION

1. Field of the Invention

This invention relates to cryptographic systems, and more specifically to systems including public key digital signatures.

2. Description of Prior Art

The concept of digital signatures promises to be an important one in commercial applications of cryptographic techniques. The digital signature concept is quite simple. Suppose a bank wishes to be able to make digital signatures that can be checked by all its customers. The bank develops a mathematical function, and supplies all its customers, and anyone else who cares to know, complete instructions for efficiently computing the function. The trick is, that when the bank developed the function, it included in it a trapdoor. This trapdoor allows the bank to efficiently compute the inverse of the function. Because it is infeasible to compute the inverse of the function without knowing the trapdoor, only the bank can compute the inverse of the function. Thus, if a customer of the bank sees a message that could only have been created by someone who knows how to compute the inverse of the function, then the customer knows that the message must have come from the bank.

The concept of digital signatures was first proposed in the literature by Diffie, et al, in "Multiuser Cryptographic Techniques," AFIPS-Conference Proceedings, Vol, 45, pp. 109-112. The first really practical example functions with the required trapdoor properties were disclosed by Rivest, Shamir and Adelman, in "A Method for Obtaining Digital Signatures and Public-Key Cryptosystems," Communications of the ACM Vol. 21, No. 2, February 1978. This system has become known as "RSA", after its inventors, and remains the most credible candidate for widespread use. It is based on two main ideas. The first is that is relatively easy for someone to create a large number for which only he knows the prime factors. (One way to accomplish this is for the creator to form the number as the product of two suitable sufficiently large primes chosen at random. Such primes are easily found by random trial and error since the density of primes even in the neighborhood of 50 digit numbers is on the order of one percent, and reasonably efficient primality tests are well known in the art.) The second main idea is that knowing the prime factors of the modulus under which exponentiation is performed allows one to produce pairs of exponents that behave as inverses.

In other words, consider the function $f(x) = x^e \mod n$, to be the result of raising x to the power e and then finding the remainder after dividing by n. There may be a number d, such that $g(x) = x^d \mod n$ and $g(f(x)) = f(g(x)) = x$. If one chooses primes p and q and a suitable e, one can readily compute a corresponding d, simply as the multiplicative inverse of e modulo $((p-1) \times (q-1))$, such modular multiplicative inverses to be described. It is thought to be almost impossible to compute d from e and n without knowing p and q, and almost impossible to determine p and q from n. Thus, if e and n are made public, anyone can compute f(x), but only the creator of n can compute the inverse g(x).

There are a variety of ways to use such a "public signature function" and its inverse "secret signature function" to make digital signatures. In general it is not desirable to maintain that any message which results from applying the public signature function is a valid signed message. The reason is that anyone could create a number at random and claim that it was a signature on the message that results when the public signature function is applied. One solution to this problem is to designate some subset of the messages as "valid messages" such that, for example, only one in $10^{50}$ messages is valid. Thus someone would have to apply the public signature function to an average of $5 \times 10^{49}$ random messages, (which may not be a credible threat) before obtaining a valid message as a result. (An RSA system with a one-hundred digit modulus would still have $10^{50}$ possible valid messages.) The process of "checking" a digital signature in such a scheme involves applying the public signature function to the digital signature to be checked, and determining whether the resulting number is a member of the set of valid messages.

It is anticipated that a bank may wish to use digital signatures to validate various numbers that are to serve as electronic money. The bank will form digital signatures of valid numbers, and sell them to individuals by charging the individuals' accounts say one dollar for each signed number. These digitally signed numbers might be thought of as electronic bank "notes". An individual can check the digital signature on such a digitally signed note by applying the public signature function of the bank to the note and verifying that the result is a valid message. When the individual wishes to pay for some goods or services, say for example buying something costing one dollar at a shop, the individual gives the digitally signed note to the shop as payment. The shop can then check the digital signature on the note. If the result of the check is positive, then the shop can supply the digital signature to the bank, who can deposit one dollar in the shop's account, after again checking the signature on the note. The bank will also keep a list of the valid numbers which have been previously cleared, to prevent the same one from being used more than once. Of course, many different denominations of such digitally signed bank notes might actually be offered for sale by the bank, each denomination using a different pair of signature functions.

The problems with such payments systems possible under the prior art is that the bank will always be able to know which account a note was withdrawn from and which account it is ultimately deposited to—and this poses serious problems from a personal privacy perspective. As more and more payment transactions become automated, and more and more data associated with transactions is captured electronically, a tremendous amount of data about a person's habits, affiliations, lifestyle, whereabouts and so on could be captured by the bank in electronic form. This places the bank in a position it would rather not be in, because it has to to convince its customers that it handles this data properly, and also because of possible legal exposure, there will be various costs, restrictions on and interference with operating procedures and personnel. The customers of the bank are also placed in an undesirable position, since there may always be some doubt as to how such data is actually being used or might be used in the future.

This example illustrates the need for signature systems that do not allow the signer to trace all things validated with his signature. Many other similar situations, such as notarizations, stocks, bonds, other certificates, credentials, authorizations and so on are also anticipated.

OBJECTS OF THE INVENTION

Accordingly, it is an object of the present invention to provide a system utilizing digital signatures in which the provider of a message for signing can transform the message to be signed into a form which obscures the content of the message, the signer can sign the transformed message and return it to the provider, and the provider can transform the signed message in such a way that the result retains the digital signature property related to the original message content, but the result is not readily associated with the transformed message received by the signer.

Another object of the present invention is to provide a system which can be used in a payment or other type of system as previously described, wherein, for example, the provider may choose a valid bank note message at random, transform it, have it signed in transformed form, and transform it back to a form related to the original note but bearing a digital signature property.

Another object of the invention is to provide a system with the additional property that the security of the system against linking of the transformed messages received by the signer with the signed messages ultimately revealed by the provider does not rely on arguments based on computational infeasibility.

Another object of the invention is to provide additionally the property that if only j things are signed, then no more than j signatures can be developed by the provider(s).

Yet another object of the invention is to allow messages to be transferred through what might be thought of as a series of more than one provider on the way to the signer and returned through a related series of providers.

Still another object of the invention is to provide efficient, economical and practical apparatus and methods fulfilling the other objects of the invention.

Other objects, features, and advantages of the present invention will be appreciated when the present description and appended claims are read in conjunction with the drawing figures.

BRIEF SUMMARY OF THE INVENTION

In accordance with these and other objects of the present invention, a brief summary of an exemplary embodiment is presented. The concept of blind signatures may be understood by an analogy based on carbon paper lined envelopes. Suppose Alice supplies Bob with a first envelope and a second envelope, each containing a piece of carbon paper facing a blank white slip of paper. Bob signs both envelopes on the outside with identical signatures and returns them to Alice. Alice privately removes the paper slips from the envelopes, each slip now bearing a carbon image of Bob's signature; places the slips in a random order; presents them to Bob; and asks him which slip was in the first envelope. Bob cannot answer with certainty, though he knows each slip was in an envelope he signed, because he does not know which slip was in which envelope.

Figure 2A:
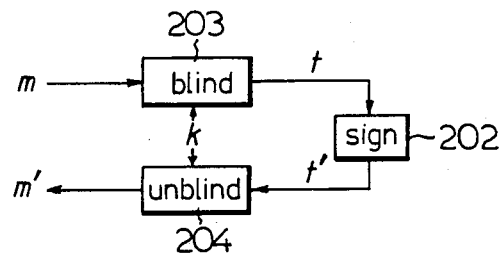
FIG. 2a shows a block diagram of a single provider user in accordance with the teachings of the present invention.

Turning now to FIG. 2a, one exemplary embodiment will be described in simplified form to introduce some central concepts, but such description should not be taken to limit the scope of the invention, which is described more fully elsewhere in the present specification. Two cryptographic transformation, "blinding" 203 and "unblinding" 204, are shown depending on a secret cryptographic key k. A digital signature transformation 202 is shown, which depends on secret signing information not shown for clarity.

The original message m (corresponding to the blank slip of paper in the analogy above) is first encrypted by blinding transformation 203 (which corresponds with placing the slip in the envelope), resulting in transformed message 6 (corresponding to the slip in the envelope). A digital signature responsive to the transformed message t is then developed by signing transformation 202 (corresponding with Bob signing the outside of the envelope), and is shown as t' (corresponding to the signed envelope). The unblinding transformation 204 takes t' and converts it by use of key k into a variant m' of the original message m which retains a signature property (corresponding to the signed slip removed from the envelope by the party who placed it there).

This entire procedure would normally be repeated more than once, say 1 times, using a fresh key $k_j$, $1 \leq j \leq 1$, each time (just as there were multiple envelopes in the analogy). Thus, a set of signed values $\{m'_j\}$ is generated (corresponding to a set of signed slips), as well as a set of transformed value $\{t_j\}$ (corresponding to a set of envelopes). An important property of such a blind signature system is that if the signer knows only the two unordered sets, and not the keys $k_j$, then the signer is unable to readily determine the correspondence between the elements of the two sets (just as Bob was unable to tell which slip was from which envelope)—even though the signer is assured by the signature property that such a correspondence must exist.

In one embodiment of the present invention, based on the RSA digital signature system as earlier described, the following congruences might hold:

$$t \equiv [m] \times k^3 \pmod{n},$$

$$t' \equiv [m \times k^e]^d \equiv m^d \times k \pmod{n}, \text{ and}$$

$$m' \equiv [m^d \times k] \times k^{-1} \equiv m^d \pmod{n},$$

where n is the publicly known modulus and e and d are exemplary public and private signature exponents respectively. The square brackets show the input to the transformation whose output is shown on the left hand side, and thus they define the function of each of the three transformations. The signature property of m' might be checked by anyone with access to the public signing function based on e, simply by forming $m'^e$ mod n and checking whether the result is a valid message m.

GENERAL DESCRIPTION

General descriptions of the functions of some constituent parts of the present invention will now be presented.

Line 155 shows the output of blinding transformation 103 being input to signing transformation 102; line 157 shows the output of signing transformation 102 being input to unblinding transformation 104; line 159 shows the output of unblinding transformation 104 being input to signature checker 105. The method or means whereby such information is transferred as shown by these lines is not essential to the present invention, and may be accomplished in any suitable way. For example, the output and input means may be brought into physical proximity with each other, or they may communicate remotely by any kind of communication network or other technique. The information may be encoded in various forms, some of them cryptographic, and decoded and transformed between codings on its way. Similarly the information may be stored and/or detained in various forms along its way.

The term "party" is used herein to indicate an entity with control over some secret information. In some cases, a party might be a person who knows a secret cryptographic key. It is anticipated that a plurality of people may each know part or all of some key matter, and then they might collectively be thought of as a party. In other cases, a key may normally be known only to apparatus and not people, and the apparatus or the people able to utilize the apparatus may be regarded as parties. Different people may use the same apparatus each with different keys, assuming they all have some trust in the apparatus, and then they might be regarded as separate parties. Thus, for example, signature transformation 102 may be regarded as a step in a method or part of an apparatus, and/or it may be regarded as a party, and it may be called signer 102 or signer party 102.

Key source 123 is shown without inputs and with output 153. The function of key source 123 is to output a value normally at least partially unknown to at least the signer party 102. It is preferred that the output is nearly completely unknown outside the provider 101, and may not even be known to any persons but only to apparatus. The term "secret key" may be used herein to refer to information, such as the output of key source 123, that is normally supposed to be unknown to various parties. Many means and methods are known in the art for generating such keys. One approach uses unpredictable physical phenomena, such as noise in a semiconductor or other electronic component or radioactive decay, or timing of events generated by asynchronous processes, such as humans pushing buttons. Another approach uses algorithmic transformations on other secret information. Of course these two approaches can readily be combined. The output of the key source is shown as input to transformations 103 and 104. The probability distribution of keys is obviously of interest. In the preferred embodiment, they are preferably as nearly uniformly distributed as practical. The output may be generated initially for one, and then retained, possibly in encrypted form, and/or in some protected and/or tamper indicating or tamper responding apparatus. An equivalent approach for the present invention would be re-generating the key algorithmically each time it is needed.

Signature checker 105 is shown as taking its input from the output of unblinding transformation 104, line 159, and producing output 161, shown in the preferred embodiment as m. The function of checker 105 is to produce an indication of whether the input value has the properties of a valid signature. An implicit input is the public signature information, shown as e in the preferred embodiment. The authenticity of this information forms the basis for the authenticity decision about the signature input, and thus such information may shown contained within checker 105. Checker 105 serves a logical function of indicating whether or not the signature appears to have been transformed using the secret signature information corresponding to the public signature information; any means or method performing this function may be regarded as a signature checker. (Other data may also be output by the checker 105, such as parameter values included during formation of the signature.)

Various signature means and methods are known or would be obvious to those skilled in the art. One method, that of choosing a subset of the domain of the signature function as valid messages, has already been described. Another approach might not make such a restriction, but might instead rely on information additional to the output of the signature function for input to the checking function. One-way functions may be thought of as public functions without publicly known inverses, such functions being well known in the art, such as the public function of an RSA system as earlier described, or those first disclosed by Purdy in "A High Security Log-in Procedure," Communications of the ACM, Vol. 17, No. 8, August 1974, p. 442. Suppose the range of a one-way function y(x) is the domain of a private signing function g(x), with public signature function inverse f(x). One way to use such functions to form digital signatures is to form a signature, s, as the secret signature function of the image of the desired message, a, under the one-way function, $s=g(y(a))$. A signature can be authenticated under such a scheme if numbers a and s are presented to the checker 105, such that $y(a)=f(s)$. Notice that if the domain of y is larger than its range, then it serves to compress the matter to be signed. Also notice that if the range of y is smaller than the domain of g, then all or part of the number a may be encoded as the rest of the domain of g. In some cases a strict one-way property may not be required.

Signing transformation 102 outputs some transformation of its input which depends on signing information at least secret from the other parties, shown as d in the preferred embodiment. Various exemplary signing transformations have been described above, but the function of the signing transformation should be regarded as any transformation at least partially responsive to the information to be signed and to secret signing information, such that some suitable checking function can be performed meaningfully. The term party, as mentioned earlier, may be used when referring to the signing transformation 102, and then it would be appropriate to say signer 102.

Blinding transformation 103 takes a message from line 151, shown as m in the preferred embodiment, and a secret key from line 153. The nature of the source of m is not essential to the present invention, but the particular value of m resulting in an actual particular output of blinding transformation 103 received by signer 102 should not normally be revealed to the signer 102 by such a source, as this would allow the correspondence to be learned by the signer. The function of blinding transformation 103 is to produce output that does not normally reveal the actual message input to those not in possession of the secret key k, and to cooperate with the singing and unblinding transformations, as will be described. Thus, the blinding transformation may be thought of as a cryptographic transformation which hides some message by use of a key, with additional properties that allow it to cooperate with the other transformations.

Unblinding transformation 104 takes a key from line 153 and a value from the signature transformation 102 on line 157, and produces an output shown as line 159. The function of unblinding transformation 104 is to transform its input into a form which "retains a digital signature property related to original message m". In other words, a checker 105 should be able to return a positive result when supplied output of unblinding transformation 104, and possibly other appropriate information, such result indicating that a signature related to the original message m has been authenticated.

Several possible properties of blind signature systems will be described in accordance with the teachings of the present invention.

One general property of a blind signature scheme is that the blinding transformation should make it difficult, if not impossible, to determine the message m with certainty from the transformed message t without key k. For the purposes of the present description, this property will be referred to as "hiding", and thus it may be said that the blinding transformation hides the message. In the preferred embodiment, as mentioned earlier, the blinding transformation includes multiplying modulo n by $k^e$. If e is non-zero and fixed and coprime with $\phi(n)$, and k is chosen from the interval 0 to $n-1$, then the signing function $g(k) \equiv k^e \pmod{n}$ is one-to-one and onto. If m is coprime with n, then $h(m) \equiv g(k) \times m \pmod{n}$ is one-to-one and onto. Thus, under the assumptions of proper e, and m coprime with n, a particular value of t could correspond with any value of m, with unique suitable k. In a sense then, it is believed that, the security of the hiding in the blinding transformation of the preferred embodiment is comparable to that of the so called one-time pad, when $GCD(m,n) = GCD(e,\phi(n)) = 1$, and k chosen uniformly from the interval 0 to $n-1$. Of course, if e is not coprime with $\phi(n)$ then certain messages may have no signature; and if it is likely that m is not coprime with n, then it is likely that someone can guess a factor of n, or providers could use Euclid's algorithm to reject any non-coprime m.

Another property of a blind signature scheme which may be important in some anticipated applications will be called "conservation of signatures". This property requires that it not usually be easy for someone to construct a set of transformed messages such that after each member of the set is signed, more authenticatable signatures can be derived than original members of the set were signed. The preferred embodiment, as mentioned earlier and to be described in detail, is believed to have this property in practice, when suitable signature authentication techniques are used, such as when a strong one-way function of suitably large range and domain is used in the signature authentication scheme, as described earlier. One possible explanation for this property holding is that a set of 1 signed things can be thought of as giving at most 1 equations, and these can be solved for at most 1 unknowns.

Yet another property of a blind signature system will be called the inability to "link", which may be understood as follows. Suppose there are 1 different messages, $m_j$ for $1 \leq j \leq 1$. Each message is the input to a blinding transformation, using key $k_j$, and the result is 1 blinded messages $t_j$. (It is not essential whether each message is blinded by a different party, all messages are blinded by the same party, or various parties each blind some subset of the messages.) Suppose further that the signer applies the signing transformation to each blinded message $t_j$, and returns each transformed messages $t'_j$ to its provider. Further suppose that each provider applies the appropriate unblinding transformation to each $t'_j$, yielding a collecton of 1 unique messages $m'_j$, each bearing a signature property. Suppose still further that the signer receives an unordered set whose 1 elements are exactly the $m'_j$, which may be denoted $\{m'_i\}$ for $1 \leq i \leq 1$. Finally, assume that the signer knows only the 1 things he has signed, $t_j$, and the set $\{m'_i\}$, and no outside information about the provider(s), their keys, or information flows from or to the provider(s). The signer can "link" the things received for signing $t_j$ with the things known to have the signature property $\{m'_i\}$, if and only if he can determine with certainty for every element of $\{m'_i\}$, the unique $t_j$ which corresponds with the same message m, under the assumptions above. If nothing at all can be known about the correspondence, under the assumptions above, not even associating different probabilities with different correspondences, then the blind signature system may be said to be "completely unlinkable." The term "blinded" may be used to indicate that it is not usually easy to completely link. For example, one m' and one t may be said to be blinded from each other without k, if it cannot usually easily be determined without k that the two correspond.

In the preferred embodiment, as mentioned earlier and to be described in detail, it is believed to be possible to come close to, or in some cases under certain assumptions even achieve, complete unlinkability. A possible explanation for this might be that for each possible way to put the 1 items into correspondence, there could exist a unique set of values for the keys $k_j$, such that this would be the true correspondence, but assuming each k is chosen so that all values are equally likely, all possible correspondences are equally likely. (Of course the question of actual generation of random numbers from a perfectly uniform distribution is beyond the scope of the present description.) It is believed that one possible explanation of this may be seen by considering the position of the signer as follows. He has two sets of values: $\{t_j\}$, and $\{m'_i\}$. If he assumes that $t_v$ corresponds with $m'_u$, then he can determine the unique k which would have been used to form $t_v$. This may be accomplished by solving the congruence $t_v \times k_v^e \equiv m'_u{}^e \pmod{n}$, for $k_v$. To do this, one may first compute the multiplicative inverse of $m_u$ modulo n, and assuming that m and n are coprime, as mentioned earlier, there is a unique such value. Then the unique product of this value and $t_v$ is formed, modulo n. Finally, the result is raised to the d power modulo n, producing a unique result, assuming that e is coprime with $\phi(n)$. Thus, under the assumptions, for every possible way the two sets could be linked, there exists unique choices for the keys $k_j$ that would make this the true linking, and, as mentioned above, since the k's are by assumption chosen from a uniform distribution, all such choices for the keys $k_j$ are equally likely, and so all possible linkings are equally likely. This concept is further illustrated by numerical examples as will be presented in the detailed description of the preferred embodiment.

Referring now to FIG. 2, several exemplary modes of use in accordance with the teachings of the present invention will be presented.

FIG. 2a shows a mode of use with only a single cryptographic blinding and corresponding cryptographic unblinding transformation, as mentioned earlier. The message m is transformed by cryptographic blinding transformation 203 into transformed message t, which is input to signature transformation 202, which transformation depends on secret signing information, now shown for clarity. The output of the signing transformation, t', is input to the unblinding transformation 204, which transformation depends on key k, and which transformation produces output m', bearing a signature propety related to the m. (Notice that blinding transformation 203, signature transformation 202 and unblinding transformation 204 of FIG. 2a correspond with blinding transformation 103, signature transformation 102 and unblinding transformation 104 of FIG. 1, respectively.)

Figure 2B:
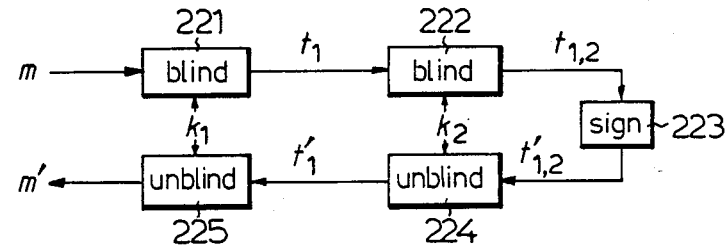
FIG. 2b shows a block diagram of a first two provider use in accordance with the teachings of the present invention.

Referring now to FIG. 2b, a first mode of use in shown with two cryptographic blinding transformations, two cryptographic unblinding transformations, and two separate keys for these transformations. The original message m is transformed by blinding transformation 221, which transformation depends on key $k_1$, producing output shown at $t_1$, and then supplied as input to blinding transformation 222, which transformation depends on key $k_2$, and whose output shown as $t_{1,2}$. Signing transformation 223 takes this multiply transformed message as input and produces, in a way depending on secret signing information, not shown for clarity, output shown as $t'_{1,2}$. This output is shown as input to unblinding transformation 224, which depends on key $k_2$, and produces output shown as $t'_1$. This output is input to unblinding transformation 225, which depends on key $k_1$, and which produces output shown as m' retaining a digital signature property related to m.

In one use of this mode based on the preferred embodiment, described earlier and to be described in detail, the following congruences might hold:

$t_1 \equiv m \times k_1^e \pmod{n}$, $t_{1,2} \equiv t_1 \times k_2^e \pmod{n}$, $t'_{1,2} \equiv t_{1,2}^d \equiv m^d \times k_1 \times k_2 \pmod{n}$, $t'_1 \equiv t'_{1,2} \times k_2^{-1} \equiv m^d \times k_1 \pmod{n}$, $m' \equiv t'_1 \times k_1^{-1} \equiv m^d \pmod{n}$, and the checking function can be based on the congruence $m'^e \equiv m \pmod{n}$. Thus, the blinding transformation 221 and 225 as well as the unblinding transformation 222 and 224 are each nearly the same as in the single key mode of the preferred embodiment to be described in detail.

If only a single party with access to both keys $k_1$ and $K_2$ uses this mode, then it may be equivalent to a single key use, as in the preferred embodiment. The present mode may have additional benefits, advantages and features, however, in some anticipated applications. Consider the case where one party holds $k_1$ and a second holds $k_2$. Both parties become mutually dependent once the signature transformation has been made: the first party requires the cooperation of the second to transform $t'_{1,2}$ into m'; similarly, the second party requires the cooperation of the first to transform $t'_1$ into m'. In the embodiment described above, the second party can check that the signer 223 has performed the proper function, by checking that $t_{1,2} \equiv t'_{1,2}{}^e \pmod{n}$. The first party is in a position to check the signature function performed by signer 223 by checking that $t_1 \equiv t'_1{}^e \pmod{n}$, but this function is also available to the single provider party in a single non-signer party mode of use, but it is anticipated that the signature would normally be checked by the single party by checking that $m \equiv m'^e \pmod{n}$. Notice also that the communication between the second party and signer 223 in the present mode is obscured from the first party. For example, the second party may be second party to several first parties, and they may not know which of the communications with signer 223 include their particular values of m. Similarly, the second party may obscure from the signer which of the communications with first party(s) correspond to particular signature transformations made by signer 223. In some embodiments, such as the preferred embodiment, it may even be the case that cooperation between the first party and signer 223 to determine the correspondence between communications known to one and communications known to the other can be thwarted by the second party.

Of course the present discussion can readily be generalized to a use based on a plurality of provider parties—not just two or fewer non-signer parties. In a multiple provider party use based on the preferred embodiment: each party performs transformations just as if they were in a single or two non-signer party use as described herein; parties may readily check that the signature property has been properly applied and transferred by the signer and those parties on the signer's side; and any intermediary party is able to thwart attempting linking even by cooperation of all other parties.

Figure 2C:
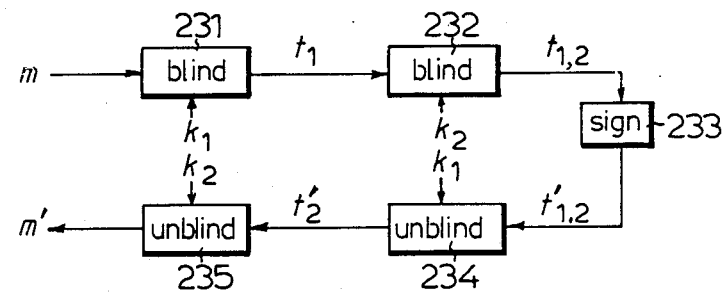
FIG. 2c shows a block diagram of a second two provider use in accordance with the teachings of the present invention.

Referring now to FIG. 2c, a second mode of use is shown with two cryptographic blinding transformations, two cryptographic unblinding transformations, and two keys for these transformations. The original message m is transformed by blinding transformation 231, which transformation depends on key $k_1$, producing output shown as $t_1$ and then supplied as input to blinding transformation 232, which transformation depends on key $k_2$, and whose output is shown as $t_{1,2}$. Signing transformation 233 takes this multiply transformed message as input and produces, in a way depending on secret signing information, not shown for clarity, output shown as $t'_{1,2}$. This output is shown as input to unblinding transformation 234, which depends on key $k_1$, and produces output shown as $t'_2$. This output is input to unblinding transformation 235, which depends on key $k_2$, and which produces output shown as m', retaining a digital signature property.

In one embodiment of this mode of use based on the preferred embodiment, described earlier and to be described in detail, the following congruences might hold:

$t_1 \equiv m \times k_1^e \pmod{n}$, $t_{1,2} \equiv t_1 \times k_2^e \pmod{n}$, $$t'_{1,2} \equiv t_{1,2}{}^d \equiv m^d \times k_1 \times k_2 \pmod{n},$$

$$t'_2 \equiv t'_{1,2} \times k_1{}^{-1} \equiv m^d \times k_2 \pmod{n},$$

$$m' \equiv t'_2 \times k_2{}^{-1} \equiv m^d \pmod{n},$$

and the checking function can be based on the congruence $m'^e \equiv m \pmod{n}$. Thus, the blinding transformation 231 and 235 as well as the unblinding transformation 232 and 234 are each nearly the same as in the single key mode of of the preferred embodiment to be described in detail.

Again, little advantage may result if one party uses two separate keys. The present mode may have additional benefits, advantages and features, however in some anticipated applications. Consider the case where one party hold $k_1$ and a second holds $k_2$, as before. In the earlier described first two provider mode of use, the second party could cheat the first party by simply discarding $t_1$ and supplying some $t_2$ of the second parties' choice to signer 223. Then the second party could unblind the resulting $t'_2$ received from signer 223, and obtain the signature property on something chosen only by the second party, leaving the first party without the expected message bearing the signature property. In the present mode, however, if the signer only signs $t_{1,2}$ when supplied by the second party, and returns the $t'_{1,2}$ only to the first party, then neither party can cheat the other.

Of course both modes shown with two non-signer parties can readily be generalized in combination: a message travels through one permutation of the parties on the way to the signer and through a possibly different permutation on the way back. The no linking property is believed to still hold for any single intermediary party; the no cheating property holds for a party if no cheating party is between the party and the signer in at least one direction.

DETAILED DESCRIPTION OF PREFERRED EMBODIMENT

Figure 1:
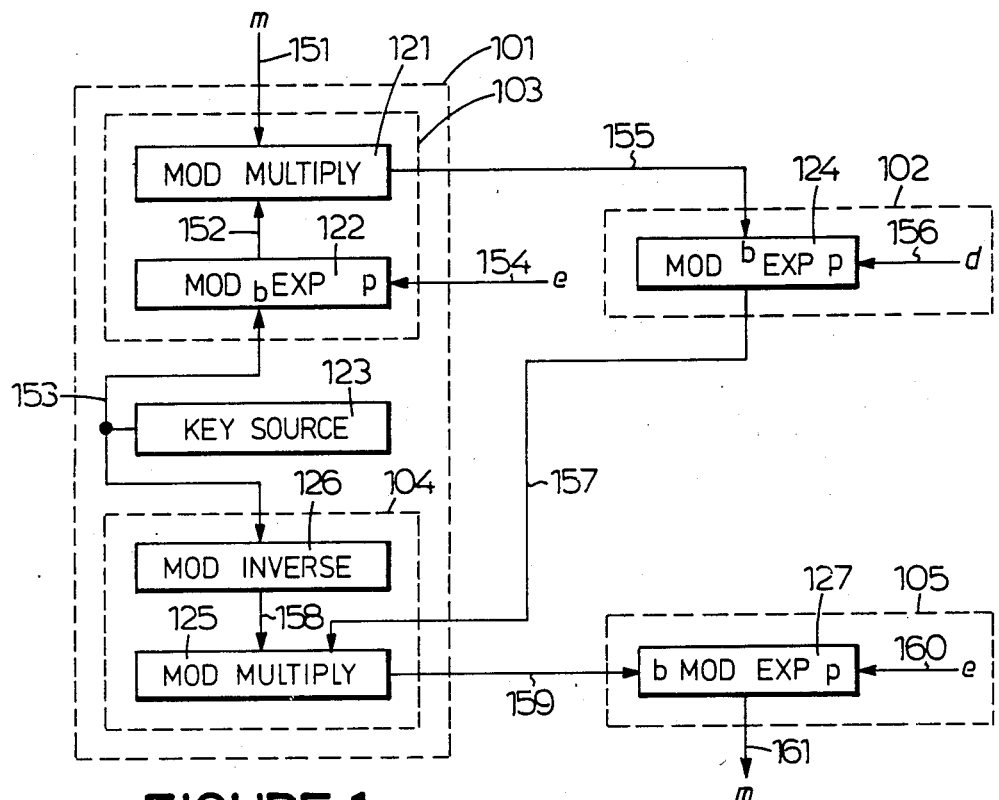
FIG. 1 shows a combination functional and detailed block diagram of a blind signature system in accordance with the teachings of the present invention.

Turning now to FIG. 1, a detailed descripton of a preferred embodiment of the present invention is presented. One party to the system will be referred to as the "provider", shown as contained in the dashed box 101. Another distinguished party in the system is the "signer", shown as contained within dashed box 102. A key source for developing a secret key, preferably confidential to the provider, is shown contained within the provider 101. A secret signing key, d, is shown contained within signer 102. The provider also contains the ability to perform two transformations. A "blinding" transformation 103 and an "unblinding" transformation 104: a checking function 105 is also shown.

The message appears on line 151 as one multiplicand input to modular multiplier 121, such multipliers to be described. The other multiplicand input to modular multiplier 121 is from line 152, which is the output of modular exponentiator 122, such modular exponentiators to be described. The base input to exponentiator 122 appears on line 153, and is the key output from key source 123, such key sources described earlier. The exponent, or as used equivalently herein, the power input to exponentiator 122 is from line 154, and is the public signature exponent shown as e. The product output of multiplier 121 appears on line 155, which line is the base input to modular exponentiator 124. The exponent to exponentiator 124 is the secret signing key shown as d, which appears on line 156. The output of the exponentiator 124, in this embodiment, is the digital signature of its input base from line 155, and appears on line 157, which is input to modular multiplier 125. The other multiplicand input to multiplier 125 appears on line 158, which is the output of modular inverter 126, such modular inverters to be described. The modular inverter takes its input from the key source 123 mentioned earlier as line 153. The product output of modular multiplier 125 appears on line 159, which is base input to modular exponentiator 127. The power input to exponentiator 127 is shown as e on line 160. The output of exponentiator 127 is shown as m on line 161.

The operation of the preferred embodiment shown in FIG. 1 will now be described in detail. A message m is obtained on line 151 by the provider. A key on line 153, denoted as k, preferably secret to the provider, is developed by key source 123, and is preferably chosen from the interval 0 to $n-1$ with each value as nearly equally likely as practical. The blinding transformation 103 takes these two inputs, lines 151 and 153, and forms a blinded message denoted as t on its output line 155, such that $t \equiv m \times k^e \pmod{n}$. These functions of the blinding transformation 103 are accomplished as follows. Modular exponentiator 122 takes the key k as its base input from line 153 and takes the public signature key e from line 154, and outputs on line 152 a value congruent modulo n to $k^e$. Modular multiplier 121 takes this value from line 152 and forms the modulo n product with the input m from line 151, and the product output appears on line 155.

Now the signer 102 may obtain the blinded message t from line 155, and will normally output a digital signature of t on line 157, this output denoted as t', such that $t' \equiv t^d \pmod{n}$, where d is the secret signing exponent of the signer mentioned earlier. These functions of the signer 102 are accomplished as follows modular exponentiator 124 takes its base input from line 155, takes its power input from line 156, and its output appears on line 157.

Now the provider may perform the unblinding transformation, shown as 104. The output of the signer, t', and the secret key k are inputs to this function and it produces, in this embodiment, a digital signature on m, denoted m', such that $m' \equiv m^d \pmod{n}$. This function of the unblinding transformation is performed as follows. The multiplicative inverse of the secret key k is formed by the modular inverter 126. Then the produce modulo n of the multiplicative inverse, shown as $k^{-1}$, and the signed blinded message t' from line 157 is formed by modular multiplier 125, and its output appears on line 159.

At some latter time, one or more parties may wish to check or authenticate the digital signature m' on the original message m. This function may be performed by checking that $m \equiv m'^e$, and that m is a valid message, as described earlier. This function can be performed by the modular exponentiator 127, which takes its base input from line 159 and its power input from line 160, and whose output appears on line 161. A specific example of further checking for valid messages or the like is not shown for clarity, but such techniques would be obvious from the earlier description, and are well known to those of ordinary skill in the art. For example, the binary representation of the value on line 161 could be split into two halves, and the number considered valid if the result of comparing the two halves indicates they are identical.

The following table illustrates the operation of one use of the preferred embodiment by associating the various line numbers in the first row and their symbolic names in the second, with the exemplary values in the remaining nine data rows. The table uses an RSA system based on primes 29 and 31 chosen by the signer. The modulus made public by the signer would then be $n = 29 \times 31 = 899$. The signer is assumed to have chosen e to be 17, (possibly after checking that $GCD(17, \phi(n)) = 1$) and computed its multiplicative inverse modulo $\phi(n) = (29 - 1) \times (31 - 1) = 840$, and with the result $d = 593$. Of course such a system is based on numbers far too small to be secure. (Finding $k^{-1}$ for the value of k in the first data row is the subject of an example of the operation of the modular inverter to be described.) Notice that the first and second data rows have the same t values as the penultimate and last data rows respectively, but that their messages m are interchanged with different values of k, as mentioned earlier.

| 151 | 153 | 152   | 155 | 157 | 158      | 159 |
|-----|-----|-------|-----|-----|----------|-----|
| m   | k   | $k^e$ | t   | t'  | $k^{-1}$ | m'  |
| 628 | 255 | 886   | 826 | 19  | 691      | 543 |
| 254 | 685 | 84    | 659 | 698 | 21       | 274 |
| 40  | 393 | 210   | 309 | 340 | 716      | 710 |
| 153 | 440 | 212   | 72  | 541 | 615      | 85  |
| 755 | 748 | 16    | 393 | 110 | 256      | 291 |
| 623 | 111 | 107   | 135 | 601 | 81       | 135 |
| 724 | 308 | 461   | 235 | 69  | 108      | 260 |
| 254 | 548 | 520   | 826 | 19  | 251      | 274 |
| 628 | 94  | 807   | 659 | 698 | 373      | 543 |

Figure 3:
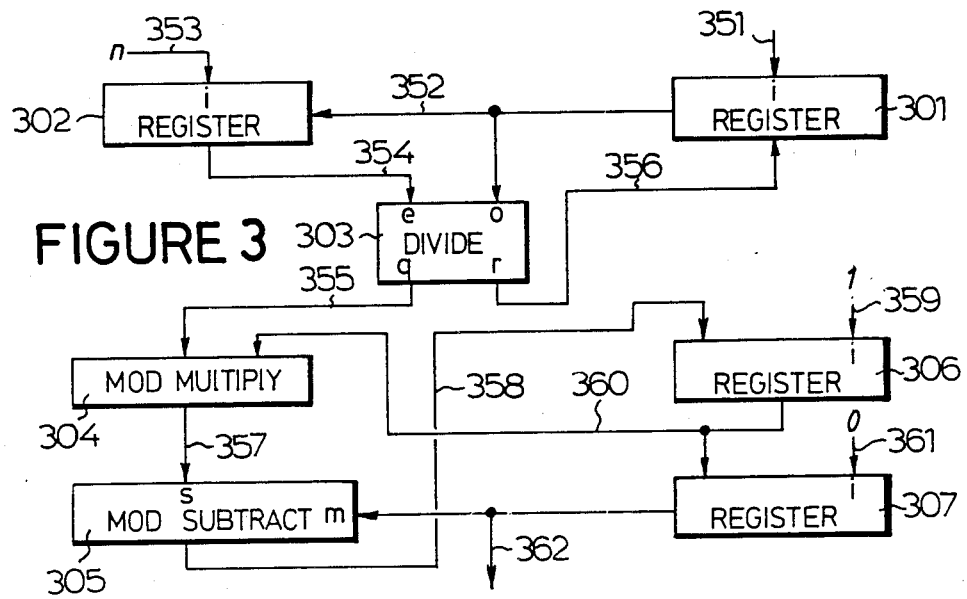
FIG. 3 is a detailed schematic diagram of an exemplary embodiment of a modular inverter.

Referring now to FIG. 3, a detailed description of an exemplary embodiment of a modular multiplicative inverter, herein called a modular inverter, is presented. The number to be inverted appears on line 351, and is initially loaded into register 301. The output of register 301 appears on line 352, which is input to register 302, which takes its initial value, the modulus n, from line 353, and has output on line 354. Ordinary arithmetic divider 303 takes its dividend from line 354 and its divisor from line 352; its quotient output appears on line 355 and its remainder output appears on line 356. Such binary arithmetic dividers for unsigned integers are well known in the art, for example see K. Hwang, "Computer Arithmetic: principles, architecture, and design" John Wiley, 1979, Chapter 7. Line 356 is input to register 301, described earlier. Line 355 is input to modular multiplier 304, such multipliers to be described. The output of modular multiplier 304 is line 357, which is subtrahend input to modular subtractor 305, such subtractors to be described. The difference output of modular subtractor 305 is line 358, which is input to register 306, which takes its initial value of 1 from line 359 and whose output appears on line 360. Modular multiplier 304 already described takes one of its multiplicand inputs from line 360. Register 307 takes input from line 360, takes its initial value of 0 from line 361, and its output appears on line 362. Line 362 is minuend input for modular subtractor 305 already described, and is the output of the modular inverter.

A detailed description of the operation of the modular inverter of FIG. 3 is now presented. The modular inverter takes an input from line 351 whose value is between 0 and $n-1$, and produces on the output line 362 a value between 0 and $n-1$ which is congruent to the multiplicative inverse modulo n of the value input. The principle of operation is based on a variation of Euclid's algorithm, and is well known in the art. See Knuth, D. E., "The Art of Computer Programming: Volume 2/Seminumerical Algorithms," Addison-Wesley, 1969, Euclid's algorithm, page 297, exercise 4.5.2 #15 on page 315, and answer to exercise 4.5.2 #15 on page 523. Initially register 302 contains n, register 301 contains the input from line 351, register 306 contains 1, and register 307 contains 0. The operation proceeds synchronously by clock pulses sufficiently spaced to allow all lines to settle between pulses. Clock pulses occur until the first time that the contents of register 301 are 0. The clock and associated lines, as well zero detector for register 301, are not shown for clarity, but would be obvious to those skilled in the art from the present description. Before the first clock pulse and after each clock pulse, divider 303 divides the contents of register 302 by the contents of register 301 and supplies the quotient to modular multiplier 304 and the remainder to the register 301. Once the quotient value settles, modular multiplier 304 forms the modulo n product of the quotient and the contents of register 306, and supplies the product as the minuend input to modular subtractor 305. Once the product value settles, modular subtractor 305 subtracts modulo n the product from the contents of register 307 and supplies the difference to an input of register 306. With the rising edge of each clock pulse, register 302 latches in new contents from line 352, and register 307 latches in new contents from line 360. During the falling edge of each clock pulse, register 301 latches in new contents from line 356, and register 306 latches in new contents from line 358. The duration of each clock pulse is short enough that the output of modular subtractor 305 and the remainder output 356 of divider 303 do not change between the rising and falling edge of a clock pulse.

The following table illustrates the operation of the modular inverter by showing the contents of the various registers at the end of each cycle. Cycles #0 shows the initial state; and as can be seen from the first row, the number whose inverse is sought is 255, initially in register 301; the modulus n is 899, initially in register 302. As can be seen from the row of cycle #6, the result in register 307 is 691.

|       | register number |     |     |     |
|-------|-----------------|-----|-----|-----|
| cycle | 301             | 302 | 306 | 307 |
| #0    | 255             | 899 | 1   | 0   |
| #1    | 134             | 255 | 896 | 1   |
| #2    | 121             | 134 | 4   | 896 |
| #3    | 13              | 121 | 892 | 4   |
| #4    | 4               | 13  | 67  | 892 |
| #5    | 1               | 4   | 691 | 67  |
| #6    | 0               | 1   | 0   | 691 |

Figure 4:
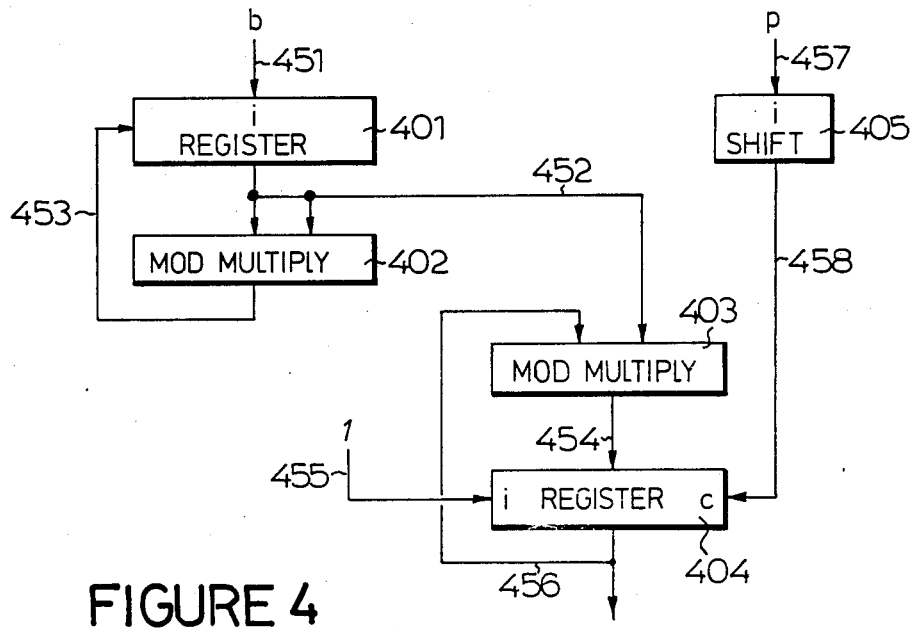
FIG. 4 is a detailed schematic diagram of an exemplary embodiment of a modular exponentiator.

Turning now to FIG. 4, a detailed description of an exemplary embodiment of a modular exponentiator is presented for completeness. The base input appears on line 451, which is an initial input to register 401. The output of register 401 appears on line 452, which is both multiplicand inputs to modular multiplier 402, to be described. The output of modular multiplier 402, line 453, is the data intput to register 401. The output of register 401, line 452, is one multiplicand input to modular multiplier 403. The product output of modular multiplier 403 appears on line 454 and is a data input for register 404. The initial value for register 404 is 1 and is shown on line 455. The contents of register 404 appear on line 456, which is input to modular multiplier 403 and also output of the modular exponentiator. The exponent input appears on line 457 and is initial data input for ordinary right-shifting binary shift register 405. The rightmost bit of shift register 405 appears as its output on line 458, which line enables the latching function of register 404, to be described.

A detailed description of the operation of the exemplary modular exponentiator of FIG. 4 is now presented. The modular exponentiator takes two inputs, a base from line 451 (represented as a value between 0 and $n-1$) and a power from line 457 (a positive binary integer), and produces on its output line 456 a value between 0 and $n-1$ that is congruent modulo n to the base raised to the power. The principle of operation is to form the product of the base raised to all powers of two that correspond with set bits in the exponent. (For example, notice that $21=2^0+2^2+2^4$, and $5^{21}=5\times5^{22}\times5^{24}=476837158203125$.) Initially, the base and exponent are in registers 401 and 405 respectively, and register 404 is reset to one. The operation proceeds in 1 cycles, where 1 is the number of bits used to represent numbers between 0 and $n-1$. At the end of each of the 1 cycles a clock line (not shown for clarity) is raised briefly from the zero state to the one state and then returned to the zero state. During the first cycle, the contents of register 401 is squared (modulo n) by modular multiplier 402 and appears on line 453, and the modulo n product of the content of register 401 and register 404 is developed by modular multiplier 403 and appears on line 454. At the end of the first cycle, on the rising edge of the first clock pulse, the value on line 453 is latched into register 401, the value on line 454 is latched into register 404 only when the enabling value on line 458 is a one bit, and on the falling edge of the clock the contents of register 405 is shifted on bit to the right. During each of the $1-1$ subsequent cycles, the new products settle on lines 453 and 454, and at the end of the cycle, with the rising edge of the clock, the value on line 453 is latched into register 401, and the value on line 454 is latched into register 404 if and only if line 458 has the enabling value of a one bit, and with the falling edge of the clock, the contents of register 405 is shifted one bit to the right. Thus, after the fall of the clock pulse 1, the last clock pulse, all the original bits of register 405 have been shifted out, register 401 contains a number congruent modulo n to the value on line 451 squared 1 times, and the content of register 404 is the desired value and is on the output line 456 of the modular exponentiator.

Figure 5:
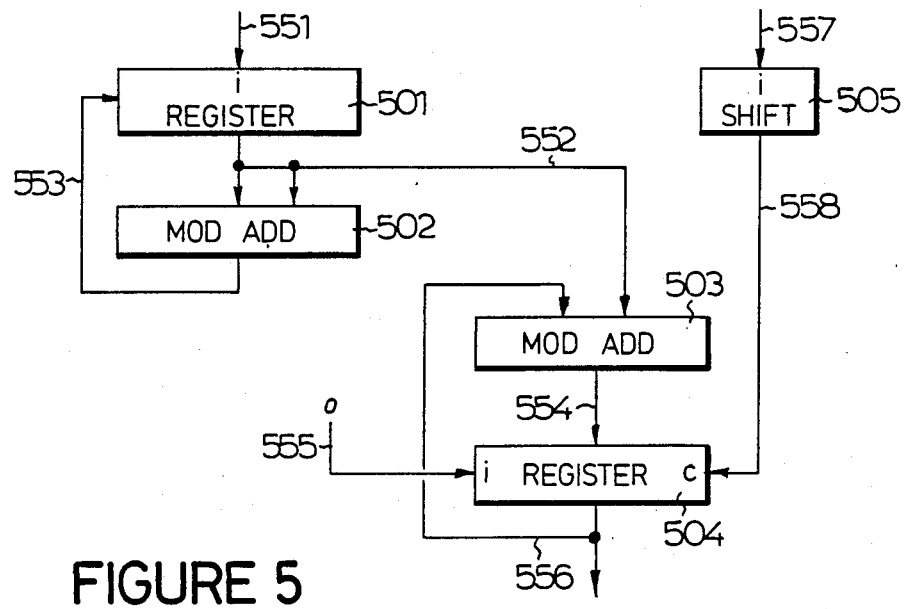
FIG. 5 is a detailed schematic diagram of an exemplary embodiment of a modular multiplier.

Referring now to FIG. 5, a detailed description of an exemplary embodiment of a modular multiplier is presented for completeness. One multiplicand input appears on line 551, which is an input to register 501. The output of register 501 appears on line 552, which is both addend inputs to modular adder 502, to be described. The output of modular adder 502, line 553, is an input to register 501. The output of register 501, line 552, is one addend input to modular adder 503. The sum output by modular adder 503 appears on line 554 and is a data input for register 504. The initial value for register 504 is 0 and is shown on line 555. The contents of register 504 appear on line 556, which is input to modular adder 503 and also the output of the modular multiplier. The second multiplicand input appears on line 557 and is data input for ordinary right-shifting binary shift register 505. The rightmost bit of shift register 505 appears as its output on line 558, which line enables the latching function of register 504, to be described.

A detailed description of the operation of the exemplary modular multiplier of FIG. 5 is now presented. The modular multiplier takes two multiplicands, one from each of lines 551 and 557, each represented as a value between 0 and $n-1$, and produces on its output line 503 a value between 0 and $n-1$ that is congruent modulo n to the product of the multiplicands. The principle of operation is to form the sum of one multiplicand multiplied by all powers of two that correspond with set bits in the other multiplicand. (Notice, for example, that $21=2^0+2^2+2^4$, and $13\times21=13\times2^0+13\times2^2+13\times2^4=273$.) Initially, the multiplicands are in registers 501 and 505, and register 504 is reset to zero. The operation proceeds in 1 cycles, where 1 is the number of bits used to represent numbers between 0 and $n-1$. At the end of each of the 1 cycles a clock line (not shown for clarity) is raised briefly from the zero state to the one state and then returned to the zero state. During the first cycle, the contents of register 501 is doubled (modulo n) by modular adder 502 and appears on line 553, and the modulo n sum of the content of register 501 and register 504 is developed by modular adder 503 and appears on line 554. At the end of the first cycle, on the rising edge of the first clock pulse, the value on line 553 is latched into register 501, the value on line 554 is latched into register 504 only when the enabling value on line 558 is a one bit, and on the falling edge of the clock the content of register 505 is shifted one bit to the right. During each of the $1-1$ subsequent cycles, the new sums settle on lines 553 and 554, and at the end of the cycle, with the rising edge of the clock, the value on line 553 is latched into register 501, and the value on line 554 is latched into register 504 if and only if line 558 has the enabling value of a one bit; with the falling edge of the clock, the contents of register 505 is shifted one bit to the right. Thus, after the fall of the 1th (final) clock pulse, all the original bits of register 505 have been shifted out, register 501 contains a number congruent modulo n to the value on line 551 doubled 1 times, and the content of register 504 is the desired value and is on the output line 556 of the modular multiplier.

Figure 6:
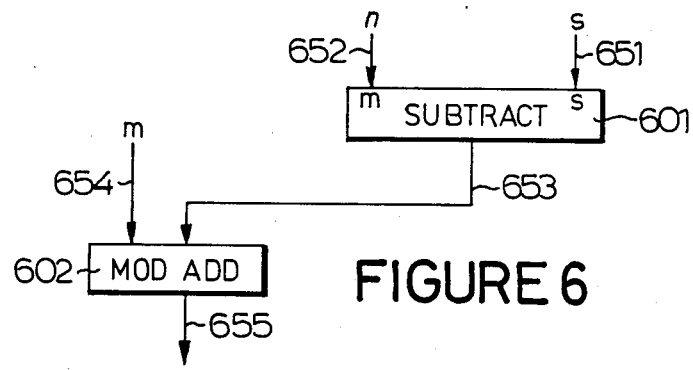
FIG. 6 is a detailed schematic diagram of an exemplary embodiment of a modular subtractor.

Referring now to FIG. 6, a detailed description of an exemplary embodiment of a modular subtractor is presented for completeness. The subtrahend to the modular subtractor is on line 651, which is the subtrahend to ordinary arithmetic subtractor 601, such ordinary arithmetic binary subtractors with positive integer inputs being well known in the art. The minuend input to subtractor 601 is on line 652 and is the modulus n. The result of the ordinary subtractor 601 appears on line 653. Modular adder 602, to be described, takes the difference from line 653 and the minuend for the modular subtractor from line 654, and produces the modulo n sum as its output on line 655.

The detailed operation of the modular subtractor of FIG. 6 is now described. Its input are numbers between 0 and $n-1$ and it produces a number between 0 and $n-1$ which is congruent to the difference of the input numbers modulo n. A number congruent to the additive inverse modulo n of the subtrahend from line 651 is developed by subtractor 601, by subtracting from n, and transmitted by line 653 to modular adder 655, and then added modulo n to the minuend on line 654, producing the result on line 655.

Figure 7:
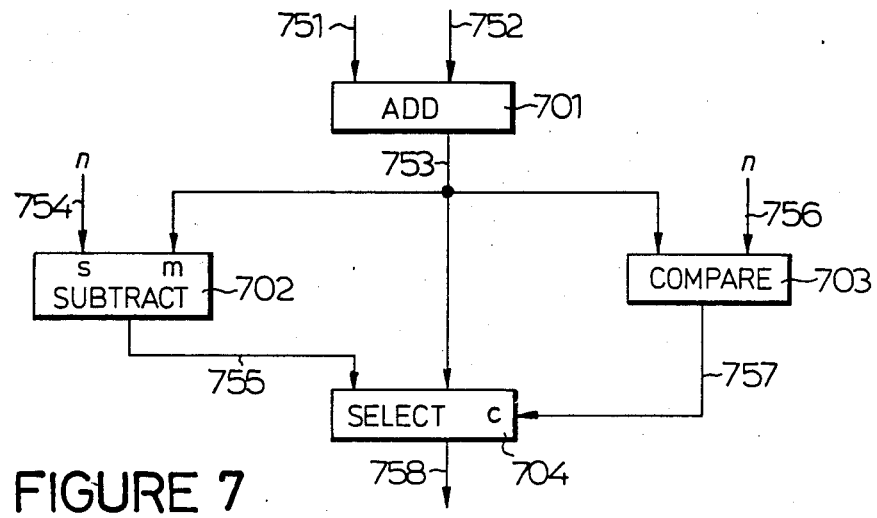
FIG. 7 is a detailed schematic diagram of an exemplary embodiment of a modular adder.

Referring now to FIG. 7, a detailed description of an exemplary embodiment of a modular adder is presented for completeness. The two numbers to be added are supplied on lines 751 and 752, which are the summand inputs to ordinary binary adder 701, such ordinary binary arithmetic adders being well known in the art. The output of adder 701 is supplied by line 753 to the subtrahend input to ordinary binary subtractor 702. The minuend supplied subtractor 702 on line 754 is the modulus n for the modular addition. The result of the ordinary subtraction by subtractor 702 appears on line 755. Ordinary binary comparator 703, such comparators being well known in the art, takes one comparend input from line 753 and the other comparend from line 756, which is the modulus n, and develops a single output bit indicating the result of the comparison, which output appears on line 757. Selector 704 takes its two data inputs from lines 755 and 753, and its control input from line 757, has output on line 758, the output of the modular adder, and outputs data from line 753 if comparator output 757 indicates that data value on line 753 is less than the data value on line 756, and outputs data from line 755 otherwise.

The operation of the exemplary modular adder of FIG. 7 will now be described in detail. The modular adder takes two numbers between 0 and n, not both n, and produces as output a third numbers between 0 and n−1 which is congruent to the sum of the inputs modulo n. Two numbers to be added modulo n appear on lines 751 and 752 and are added by ordinary arithmetic producing a sum on line 753. The sum is subtracted from n by subtractor 702 with the result on line 755. The sum is compared with n by comparator 703, with the result on line 757. If the comparison indicates that the sum is less than n then the sum is between 0 and n−1 and is output on line 758; otherwise the sum is at most n too large, and the difference of the sum and n from line 755 is output on line 758.

While these descriptions of the present invention have been given as examples, it will be appreciated by those skilled in the art that various modifications, alternate configurations and equivalents may be employed without departing from the spirit and scope of the present invention.

What is claimed is:

1. A method for processing a plurality of original digital messages by plural provider parties before they are transformed with public key digital signatures by a signer party and for processing the resulting messages by the corresponding provider parties after they have been transformed with the public key digital signatures where said processed digital messages are considered to be "blinded" and said resulting digital messages to be "unblinded" because, although the public key digital signatures of said resulting digital messages are checkable using a public key, the signer is unable to determine the correspondence between elements of said processed digital message set and elements of the corresponding said resulting digital message set, said method for processing comprising the steps of:

blinding a plurality of original digital messages by a plurality of corresponding supplier parties transforming each such message at least partially responsive to a corresponding first key to produce corresponding digital first messages;

signing each of said first messages by a signing party applying a public key digital signature thereto to produce a corresponding plurality of digital second messages;

unblinding said plurality of second messages by said supplier parties transforming each at least partially responsive to said first keys to produce a corresponding plurality of digital third messages which retain a public key digital signature property related to said original messages and to said signing step; and said blinding step being performed by said supplier parties using said first keys so as to make said signer party without the corresponding first keys unable to readily determine the correspondence between individual messages within said plurality of third messages and individual messages within said plurality of first messages.

2. A method as in claim 1 wherein, for substantially any at least two of said original messages, there exist at least two possible choices of said corresponding first keys that would produce the same said first messages and where the different choices would produce different correspondences between the original messages and the first messages.

3. A method as in claim 1 wherein there is a probability distribution for independently choosing said first keys so that it is substantially impossible for said signer party to learn substantially anything about which of said first messages corresponds with which of the second messages based upon (a) the first messages corresponding to at least two such keys, (b) the third messages corresponding to the at least two keys, and (c) said signer party's secret signing key, all taken together.

4. A method as in claim 3 wherein said first keys are substantially independently chosen from substantially said probability distribution.

5. A method as in claim 1, 2, 3 or 4 further comprising the step of transferring at least one of said first messages from the corresponding said supplier party to said signer party.

6. A method as in claim 1, 2, 3 or 4 further comprising the step of transferring at least one of said second message from said signer party back to the corresponding said supplier party.

7. A method for processing a plurality of original digital messages before they receive public key digital signatures and for processing the resulting messages after they have received the public key digital signatures where said processed digital messages are considered to be "blinded" and said resulting digital messages to be "unblinded" because, although the public key ditial signatures of said resulting digital messages are checkable using a public key, even possession of the public key and of the corresponding secret signing key does not readily allow the correspondence between the elements of said processed digital message set and the elements of the corresponding said resulting digital message set to be determined, said method for processing comprising the steps of:

blinding a plurality of original digital messages by transforming each responsive to a corresponding first key to produce corresponding digital first messages;

signing each of said first messages by applying a public key digital signature transformation thereto, using at least a secret signing key, to produce a corresponding plurality of digital second messages;

unblinding said plurality of second messages by transforming each, at least partially responsive to said first keys, to produce a corresponding plurality of signed digital third messages related to said original messages and where the digital signature property derives from said secret signing key; and said blinding step being performed using separate said first keys so as to make substantially computationally infeasible substantial linking, even using said secret signing key, of individual messages within said plurality of third messages to individual messages within said plurality of first messages.

8. A method as in claim 7 wherein, for substantially any at least two of said original messages, there exists at least two possible choices for said corresponding first keys that would produce the same said first messages and where the different choices would produce different correspondences between the original messages and the first messages.

9. A method as in claim 7 wherein there is a probability distribution for independent choice of said first keys so that substantially all pairs of individual said first messages and individual said third messages are substantially equally likely to correspond, thereby providing substantially complete unlinkability.

10. A method as in claim 9 wherein said first keys are chosen substantially independently from substantially said probability distribution and used in said blinding and unblinding steps.

11. A method as in claim 1, 2, 3, 4, 7, 8, 9 or 10 further comprising the step of checking the public key digital signature property of at least one of said third messages.

12. A method as in claim 11 further comprising the step of transferring a said third message to a party for performing said checking.

13. A method as in claim 11 further comprising the steps of:
retaining a record responsive to valid said third messages checked; and
searching said record to determine when the same said third message has been recorded previously.

14. A method for providing untraceability of value transfers by processing a plurality of original digital messages before they receive public key digital signatures and for processing the resulting messages after they have received the public key digital signatures where said processed digital messages are considered to be "blinded" and said resulting digital messages to be "unblinded" because although the public key digital signatures of said resulting digital messages are checkable using a public key, even possession of that public key and of the corresponding secret signing key is substantially insufficient to substantially feasibly determine the correspondence between the elements of said processed digital message set and the elements of the corresponding said resulting digital message set, said method for processing comprising the steps of:

blinding at least part of each of a plurality of digital original messages responsive to first keys to produce corresponding blinded first digital messages, by each of plural supplier parties;

receiving said first messages, by a signer party, and the signer party transforming at least two of said first messages, at least partially responsive to signing secret key information of said signer party, to produce second digital messages;

providing the corresponding said second messages to at least two corresponding said supplier parties in exchange for a transfer of value from such corresponding supplier parties;

receiving corresponding said second messages by said supplier parties and transforming the corresponding second messages with said first keys to produce corresponding unblinded third digital messages each having a digital signature property related to a corresponding one of said original messages thereby making it infeasible for the signer party to link said first messages with the third messages, without the first keys;

receiving at least one of said third messages by a checker party, and the checker party checking a public key digital signature related to the corresponding said original message; and maintaining a record depending on said previously checked third messages and preventing a signature related to the same such third message from being accepted more than once, and providing value in exchange for said signatures accepted.

15. A method as in claim 1, 2, 3, 4, 7, 8, 9, 10 or 14 wherein:
said blinding step includes forming a product of at least one of said original messages and a blinding factor derived from a corresponding one of said first keys; and
said unblinding step includes forming a product of the corresponding said second message with a multiplicative inverse of a signed form of said first key, in a finite structure where such multiplication and multiplicative inverses are defined.

16. A method as in claim 15 further comprising the step of checking the public key digital signature property of at least one of said third messages.

17. A method as described in claim 15 wherein:
said blinding step transforms original messages $m_i$ using first keys $k_i$ to produce first messages $t_i$ described by $$t_i = m_i \cdot k_i^e \pmod{n}$$

where is is a public signing exponent, and n is a public key digital signature modulus;

said signing step transforms said first messages $t_i$ using secret signing key d to produce second messages $t'_i$ described by $$t'_i = t_i^d \pmod{n}; \text{ and}$$

said unblinding step transforms said second messages $t'_i$ using first keys $k_i$ to produce said third messages $m'_i$ described by $$m'_i = m_i^d \pmod{n}.$$

18. A method as in claim 17 further comprising the step of checking the public key digital signature property of at least one of said third messages $m'_i$ including exponentiation to the power e.

19. A method for processing original digital messages before they receive public key digital signatures and for processing the resulting messages after they have received the public key digital signatures where said processed digital messages are considered to be "blinded" and said resulting digital messages to be "unblinded" because, although the public key digital signatures of said resulting digital messages are checkable using a public key, even possession of the public key and of the corresponding secret signing key does not readily allow the correspondence between elements of said processed digital message set and elements of the corresponding said resulting digital message set to be determined, said method for processing comprising the step of:

transforming at least part of a first input with a first blinding transformation depending on a first secret key to produce a first output;

receiving said first output and transforming said first output with a second blinding transformation depending on a second secret key to produce a second output;

receiving said second output and developing a third output at least partially responsive to the second output and to a secret signing key;

receiving said third output and transforming the third output with a first unblinding tranformation, depending on a first one of said first and second secret key, to produce a fourth output; and transforming said fourth output with a second unblinding transformation, depending on the remaining one of said first and second secret keys, to produce a fifth output, and the fifth output retaining a digital signature property related to said first input, and said third and the fifth outputs being not readily linkable without the first and second secret keys.

20. Apparatus for processing a plurality of original digital messages by plural provider parties before they are transformed with public key digital signatures by a signer party and for processing the resulting digital messages by the corresponding provider parties after they have been transformed with the public key digital signatures where said processed digital messages are considered to be "blinded" and said resulting digital messages to be "unblinded" because, although the public key digital signatures of said resulting digital messages are checkable using a public key, the signer is unable to determine the correspondence between elements of said processed digital message set and elements of the corresponding said resulting digital message set, said apparatus for processing comprising:

means for blinding a plurality of original digital messages by a plurality of corresponding supplier parties transforming each such message at least partially responsive to a corresponding first key to produce corresponding digital first messages;

means for signing each of said first messages by a signing party applying a public key digital signature thereto to produce a corresponding plurality of digital second messages;

means for unblinding said plurality of second messages by said supplier parties transforming each at least partially responsive to said first keys to produce a corresponding plurality of digital third messages which retain a public key digital signature property related to said original messages and to said means for signing; and said means for blinding by said supplier parties including means for using said first keys so as to make said signer party without the corresponding first keys unable to readily determine the corresponding between individual messages within said plurality of third messages and individual messages within said plurality of first messages.

21. Apparatus as in claim 20 wherein said means for blinding operates so that, for substantially any at least two of said original messages, there exist at least two possible choices of said corresponding first keys that would produce the same said first messages and where the different choices would produce different correspondences between the original messages and the first messages.

22. Apparatus as in claim 20 wherein said means for blinding operates such that there is a probability distribution for independently choosing said first keys so that it is substantially impossible for said signer party to learn substantially anything about which of said first messages corresponds with which of the second messages based upon (a) the first messages corresponding to at least two such keys, (b) the third messages corresponding to the at least two keys, and (c) said signer party's secret signing key, all taken together.

23. Apparatus as in claim 22 wherein said means for blinding includes means for substantially independently providing said first keys from substantially said probability distribution.

24. Apparatus as in claim 22, 21, 22 or 23 further comprising means for transferring at least one of said first messages from the corresponding said supplier party to said signer party.

25. Apparatus as in claim 22, 21, 22 or 23 further comprising means for transferring at least one of said second messages from said signer party back to the corresponding said supplier party.

26. Apparatus for processing a plurality of original digital messages before they receive public key digital signatures and for processing the resulting messages after they have received the public key digital signatures where said processed digital messages are considered to be "blinded" and said resulting digital messages to be "unblinded" because, although the public key digital signatures of said resulting digital messages are checkable using a public key, even possession of the public key and of the corresponding secret signing key does not readily allow the correspondence between the elements of said processed digital message set and the elements of the corresponding said resulting digital message set to be determined, said apparatus for processing comprising:

means for blinding a plurality of original digital messages by transforming each responsive to a corresponding first key to produce corresponding digital first messages;

means for signing each of said first messages by applying a public key digital signature thereto, using at least a secret signing key to produce a corresponding plurality of signed digital second messages;

means for unblinding said plurality of signed second messages by transforming each, at least partially responsive to said first keys, to produce a corresponding plurality of signed digital third messages related to said original messages and where the digital signature property derives from said secret signing key; and said means for blinding using said first keys so as to make substantially computationally infeasible substantial linking, even using said secret signing key, of individual messages within said plurality of third messages to individual messages within said plurality of first messages.

27. Apparatus as in claim 26 wherein said means for blinding operates so that, for substantially any at least two of said original messages, there exists at least two possible choices for said corresponding first keys that would produce the same said first messages and where the different choices would produce different correspondences between the original messages and the first messages.

28. Apparatus as in claim 26 wherein said means for blinding operates so that there is a probability distribution for independent choice of said first keys so that substantially all pairs of individual said first messages and individual said third messages are substantially equally likely to correspond, thereby providing substantially complete unlinkability.

29. Apparatus as in claim 28 wherein said means for blinding uses first keys substantially independently chosen substantially from said probability distribution.

30. Apparatus as in claim 20, 21, 22, 23, 26, 27, 28 or 29 further comprising means for time delaying messages disposed in a communication path to said means for unblinding.

31. Apparatus as in claim 20, 21, 22, 23, 26, 27, 28 or 29 further comprising means for checking the public key digital signature property of at least one of said third messages.

32. Apparatus as in claim 31 further comprising means for transferring a said third message to a party for performing said checking.

33. Apparatus in claim 32 wherein said means for transferring a third message includes means for time delaying such messages.

34. Apparatus as in claim 31 further comprising:
  means for retaining a record responsive to valid said third messages checked; and
  means for searching said record to determine when the same said third message has been recorded previously.

35. Apparatus for providing untraceability of value transfers by processing a plurality of original digital messages before they receive public key digital signatures and processing the resulting digital messages after they have received the public key digital signatures where said processed digital messages are considered to be "blinded" and said resulting digital messages to be "unblinded" because although the public key digital signatures of said resulting digital messages are checkable using a public key, even possesssion of that public key and of the corresponding secret signing key is substantially insufficient to substantially feasibly determine the correspondence between the elements of said processed digital message set and the elements of the corresponding said resulting digital message set, said apparatus for processing comprising:
  means for blinding by transforming at least part of each of a plurality of original digital messages responsive to first keys to produce corresponding blinded first digital messages, by each of plural supplier parties;
  means for receiving said first messages, by a signer party, and the signer party transforming at least two of said first messages, at least partially responsive to signing secret key information of said signer party, to produce second digital messages;
  means for providing the corresponding said second messages to at least two corresponding said supplier parties in exchange for a transfer of value from such corresponding supplier parties;
  means for receiving corresponding said second messages by said supplier parties and transforming the corresponding second messages with said first keys to produce corresponding unblinded third digital messages each having a digital signature property related to a corresponding one of said original messages thereby making it infeasible for the signer party to link said first messages with the third messages, without the first keys;
  means for receiving at least one of said third messages by a checker party and the checker party checking a public key digital signature property related to the corresponding said original messages; and
  means for maintaining a record depending on said previously checked third messages and preventing a signature related to the same such third messages from being accepted more than once, and for providing value in exchange for said signatures accepted.

36. Apparatus as in claim 35 further comprising means for introducing time delay between reception of said second messages and the sending of said third messages.

37. Apparatus as in claim 20, 21, 22, 23, 26, 29, 28, 29 or 35 wherein:
  said means for blinding includes means for forming a product of at least one of said original message and a blinding factor derived from a corresponding one of said first keys; and
  said means for unblinding includes means for forming a product of the corresponding said second message with a multiplicative inverse of a signed form of said first key, in a finite structure where such multiplication and multiplicative inverses are defined.

38. Apparatus as in claim 37 further comprising means for checking the public key digital signature property of at least one of said third messages.

39. Apparatus as described in claim 37 wherein:
  said means for blinding transforms original messages $m_i$ using first keys $k_i$ to produce first messages $t_i$ described by $$t_i = m_i \cdot k_i^e \pmod{n},$$

where e is a public signing exponent, and n is a public key digital signature modulus;
  said means for signing transforms said first messages $t_i$ using secret signing key d to produce second messages $t'_i$ described by $$t'_i = t_i^d \pmod{n}; \text{ and}$$

said means for unblinding transforms said second messages $t'_i$ using first keys $k_i$ to produce said third messages $m'_i$ described by $$m'_i = m_i^d \pmod{n}.$$

40. Apparatus as in claim 39 further comprising means for checking the public key digital signature property of at least one of said third messages $m'_i$ including exponentiation to the power e.

41. Apparatus for processing original digital messages before they receive public key digital signatures and for processing the resulting messages after they have received the public key digital signatures where said processed digitial messages are considered to be "blinded" and said resulting digital messages to be "unblinded" because, although the public key digital signatures of said resulting digital messages are checkable using a public key, even possession of the public key and of the corresponding secret signing key does not readily allow the correspondence between elements of said processed digital message set and elements of the corresponding said resulting digital message set to be determined, said apparatus for processing comprising:

means for transforming at least part of a first input with a first blinding transformation depending on a first secret key to produce a first output;

means for receiving said first output and transforming said first output with a second blinding transformation depending on a second secret key to produce a second output;

means for receiving said second output and developing a third output at least partially responsive to the second output and to a secret signing key;

means for receiving said third output and transforming the third output with a first unblinding tranformation, depending on a first one of said first and second secret keys, to produce a fourth output; and means for transforming said fourth output with a second unblinding transformation, depending on the remaining one of said first and second secret keys, to produce a fifth output, and the fifth output retaining a digital signature property related to said first input, and said third and the fifth outputs being not readily linkable without the first and second secret keys.

\* \* \* \* \*